United States Patent
Flockhart et al.

(10) Patent No.: US 8,903,080 B2
(45) Date of Patent: Dec. 2, 2014

(54) GOAL-BASED ESTIMATED WAIT TIME

(75) Inventors: Andrew D. Flockhart, Thornton, CO (US); Joylee Kohler, Northglenn, CO (US); Robert C. Steiner, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 211 days.

(21) Appl. No.: 13/163,669

(22) Filed: Jun. 17, 2011

(65) Prior Publication Data

US 2012/0321073 A1    Dec. 20, 2012

(51) Int. Cl.
*H04M 3/00* (2006.01)
*H04M 5/00* (2006.01)
*H04M 3/51* (2006.01)
*H04M 3/523* (2006.01)

(52) U.S. Cl.
CPC .......... *H04M 3/5191* (2013.01); *H04M 3/5238* (2013.01)
USPC ............ 379/266.01; 379/266.06; 379/266.08; 379/265.08

(58) Field of Classification Search
USPC ............... 379/265.01, 265.08, 265.1, 266.01, 379/266.06, 266.08
See application file for complete search history.

(56) References Cited

U.S. PATENT DOCUMENTS

| | | | |
|---|---|---|---|
| 5,506,898 A | 4/1996 | Costantini et al. | |
| 6,510,221 B1 * | 1/2003 | Fisher et al. | 379/265.12 |
| 6,714,643 B1 * | 3/2004 | Gargeya et al. | 379/266.06 |
| 7,050,567 B1 * | 5/2006 | Jensen | 379/266.01 |
| 7,778,937 B2 | 8/2010 | Ferrara et al. | |
| 2005/0071211 A1 * | 3/2005 | Flockhart et al. | 705/28 |
| 2005/0071844 A1 * | 3/2005 | Flockhart et al. | 718/105 |
| 2010/0235218 A1 | 9/2010 | Erhart et al. | |
| 2010/0296417 A1 | 11/2010 | Steiner | |
| 2011/0125793 A1 | 5/2011 | Erhart et al. | |
| 2011/0125826 A1 | 5/2011 | Erhart et al. | |

FOREIGN PATENT DOCUMENTS

| | | |
|---|---|---|
| EP | 1094655 | 4/2001 |
| EP | 1119170 | 7/2001 |
| EP | 1120953 | 8/2001 |
| EP | 1150236 | 10/2001 |
| EP | 1519550 | 3/2005 |
| GB | 2345224 | 6/2000 |

OTHER PUBLICATIONS

Flockhart et al., U.S. Appl. No. 12/882,950, Entitled "One-to-One Matching in a Contact Center", filed Sep. 15, 2010, 55 pages.
Official Action for United Kingdom Patent Application No. GB1122091.0, dated Apr. 11, 2012 7 pages.
Official Action with English translation for German Patent Application No. 102012001003.6, dated Oct. 15, 2012 9 pages.
Official Action for United Kingdom Patent Application No. GB1122091.0, dated Jul. 3, 2013 4 pages.

* cited by examiner

*Primary Examiner* — Nafiz E Hoque
(74) *Attorney, Agent, or Firm* — Sheridan Ross P.C.

(57) ABSTRACT

A contact center is described along with various methods and mechanisms for administering the same. The contact center proposed herein provides the ability to, among other things, determine an estimated wait time for contacts waiting to be serviced by resources of the contact center without relying on the traditional First-In-First-Out behavior of contact centers.

20 Claims, 5 Drawing Sheets

GOAL-BASED ESTIMATED WAIT TIME

FIELD OF THE DISCLOSURE

The present disclosure is generally directed toward communications and more specifically toward contact centers.

BACKGROUND

In today's contact center solutions, customer experiences are much more personalized. Experiences, including service level targets, are highly customized to meet the specific needs of the customer and the situation. First-In-First-Out (FIFO) and priorities are both being replaced by specific service time and completion time goals for each individual contact. The number of potential different service time goals is high and unknown to the system doing the wait time estimation.

One example of a prior art wait time prediction solution is described in U.S. Pat. No. 5,506,898, the entire contents of which are hereby incorporated herein by reference. The '898 patent describes a methodology for predicting wait time in a contact center queue of contacts. It is specifically optimized for queues with FIFO behavior and a number of priority levels. It adjusts rapidly to changing conditions and provides accurate estimates of waiting time even when conditions are dynamic.

The prior art wait-time estimation mechanisms rely on the behavior of a FIFO queue to estimate wait time. With FIFO queues being replaced by specific service time and completion time goals for each individual contact, a new mechanism for estimating wait time is required.

SUMMARY

It is with respect to the above issues and other problems that the embodiments presented herein were contemplated. This disclosure proposes a solution whereby every contact coming into the contact center is given its own unique service time goal. For example, a voice call may have a service time goal of 30 seconds, while an email may have a service time goal of 2 hours. Contacts which will ultimately be served by the same group of resources/agents may have very variable service time goals, meaning that queuing cannot be FIFO and some contacts will jump ahead of others already in queue.

Each time a contact is serviced from a "queue" its wait time is compared to its service time goal and a percentage is calculated according to the following: Actual Percentage of Goal (APG)=Wait Time/Service Time Goal*100.

For example, if a voice call with a service time goal of 30 seconds is answered in 15 seconds, its APG is 50% (15/30*100).

Each time APG is computed, a Weighted Percentage of Goal (WPG) is computed for the queue. WPG may be computed as an exponential moving average of previous APGs according to the following: $WPG(n)=X*WPG(n-1)+(1-X)$ APG; where 'n' is the current instance of time and 'n−1' corresponds to the previous instance of time or some other instance of time before the current instance of time.

Where X is a constant affecting the rate of change of WPG. In a typical implementation, X may be about 0.9. Each new calculation of WPG in this case would be weighted 10% for the latest contact and 90% for all previous contacts. In this way each new contact has more weight than the contact which preceded it.

When it is desired to calculate the expected wait time for a new contact with a service time goal (STG), the computation is made according to the following: EWT=WPG*STG For example, if WPG is currently 50% and the STG for this contact is 30 seconds, then the EWT for the contact is 15 seconds.

For better accuracy, however, this basic algorithm can be enhanced for changing conditions in the contact center.

It is possible that a sudden influx of contacts increases the number of contacts in the queue, at which point the algorithm needs to be able to adjust rapidly to changes in queue size.

Each contact remembers the original queue size (OQS) when it was placed in the queue. When it is serviced from queue, as well as computing a Weighted percent of goal (WPG) the system also computes a Weighted Queue Size (WQS) at the same time according to the following: $WQS(n)=X*WQS(n-1)+(1-X)OQS$; where 'n' is the current instance of time and 'n−1' corresponds to the previous instance of time or some other instance of time before the current instance of time.

In this way, it is known what weighted queue size resulted in the current weighted percentage of goal calculation.

The EWT calculation can now take account of the fact that the Current Queue Size (CQS) is different from the weighted queue size when computing the weighted percentage of goal. So now, EWT=(WPG*STG)*(CQS/WQS)

Another common occurrence in the contact center is that the number of working resources/agents serving a queue is constantly changing. A working resource/agent may be defined as a resource/agent who is logged in and not on break (i.e. is working). Examples of such changes would be when agents go on break and return from break.

In this case, WPG is automatically adjusted each time the Number of Working Agents (NWA) for a queue changes according to the following: $WPG(n)=WPG(n-1)*NWA(n-1)/NWA(n)$; where 'n' is the current instance of time and 'n−1' corresponds to the previous instance of time or some other instance of time before the current instance of time.

In some embodiments, no adjustments need to be made to WPG when NWA changes to or from zero.

There are some exception cases, however. As one example, when there are no calls in queue and there is at least one available agent, EWT is always zero. As another example, when there are no working agents in the queue, an infinite EWT is normally returned. As another example, when making wait time estimates for contacts already in queue, their remaining wait time is simply "EWT—time in queue (TIQ)".

It should be appreciated that the EWT estimation and reporting can be performed for both contacts already in queue and waiting for assignment to a resource as well as for contacts which have not been queued, but are about to be queued.

In accordance with at least some embodiments of the present disclosure, a method is provided which generally comprises:

receiving a work item in a contact center; and determining an Estimated Wait Time for the work item waiting to be assigned to a resource in the contact center, the Estimated Wait Time accounting for a unique service time goal assigned to the work item.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
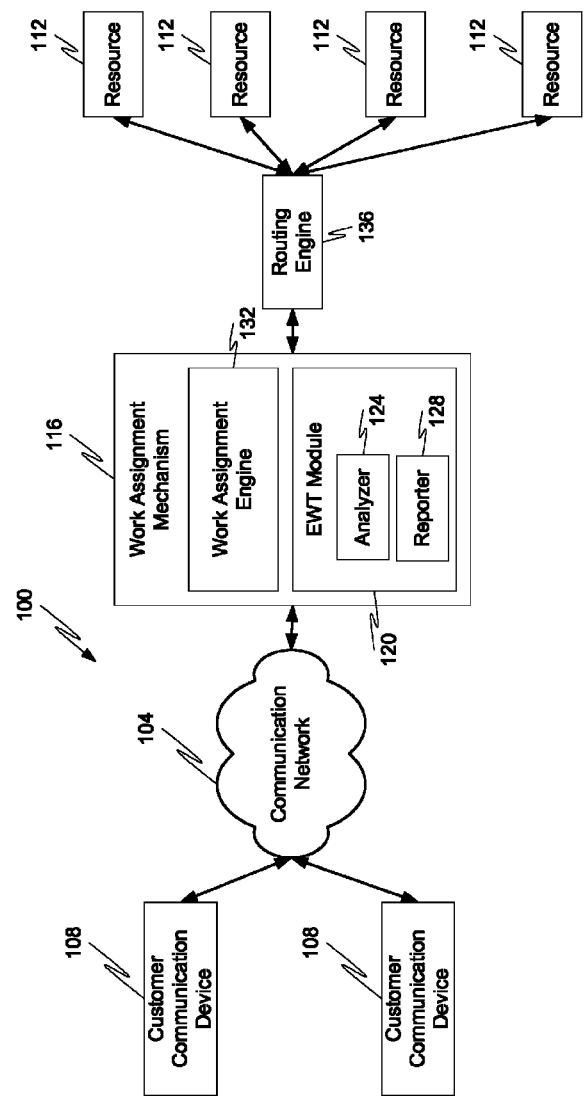
FIG. 1 is a block diagram of a communication system in accordance with embodiments of the present disclosure.

FIG. 1 shows an illustrative embodiment of a communication system 100 in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering a contact center in which a plurality of resources 112 are distributed to handle incoming work items (in the form of contacts) from the customer communication devices 108.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes and Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser. No. 12/469,523 to Steiner, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112. Exemplary work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in U.S. patent application Ser. Nos. 12/784,369, 12/706,942, and 12/707,277, filed Mar. 20, 1010, Feb. 17, 2010, and Feb. 17, 2010, respectively, each of which are hereby incorporated herein by reference in their entirety.

The format of the work item may depend upon the capabilities of the communication device 108 and the format of the communication. In particular, work items are logical representations within a contact center of work to be performed in connection with servicing a communication received at the contact center (and more specifically the work assignment mechanism 116). The communication may be received and maintained at the work assignment mechanism 116, a switch or server connected to the work assignment mechanism 116, or the like until a resource 112 is assigned to the work item representing that communication at which point the work assignment mechanism 116 passes the work item to a routing engine 136 to connect the communication device 108 which initiated the communication with the assigned resource 112.

Although the routing engine 136 is depicted as being separate from the work assignment mechanism 116, the routing engine 136 may be incorporated into the work assignment mechanism 116 or its functionality may be executed by the work assignment engine 132.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 136. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment mechanism 116 and resources 112 may be owned and operated by a common entity in a contact center format. In some embodiments, the work assignment mechanism 116 may be administered by multiple enterprises, each of which has their own dedicated resources 112 connected to the work assignment mechanism 116.

In some embodiments, the work assignment mechanism 116 comprises a work assignment engine 132 which enables the work assignment mechanism 116 to make intelligent routing decisions for work items. In some embodiments, the work assignment engine 132 is configured to administer and make work assignment decisions in a queueless contact center, as is described in U.S. patent application Ser. No. 12/882,950, the entire contents of which are hereby incorporated herein by reference.

More specifically, the work assignment engine 132 can determine which of the plurality of processing resources 112 is qualified and/or eligible to receive the work item and further determine which of the plurality of processing resources 112 is best suited to handle the processing needs of the work item. In situations of work item surplus, the work assignment engine 132 can also make the opposite determination (i.e., determine optimal assignment of a work item resource to a resource). In some embodiments, the work assignment engine 132 is configured to achieve true one-to-one matching by utilizing bitmaps/tables and other data structures.

The work assignment engine 132 and its various components may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users.

In addition to comprising the work assignment engine 132, the work assignment mechanism 116 may also comprise an Estimated Wait Time (EWT) module 120. The EWT module 120 may comprise the functionality to estimate wait times for each work item waiting to be assigned to a resource 112, even though the work items are not in a traditional FIFO queue.

More specifically, the EWT module 120 may comprise an analyzer 124 and a reporter 128. In some embodiments, the analyzer 124 may be configured to analyze all work items in the contact center that have not yet been assigned to a resource 112 and determine an estimated wait time for each of the work items. The analyzer 124 may comprise the capability to determine estimated wait times for work items which have specific service time and completion goals, where the work items potentially have different service time and completion goals.

The reporter 128 may be configured to generate and send notifications to the communication devices 108 of the estimated wait time determined by the analyzer 124. In some embodiments, the reporter 128 is configured to receive the estimated wait time determined by the analyzer 124 and prepare one or more messages containing the estimated wait time. The messages may then be transmitted via the communication network 104 to the communication devices 108. In some embodiments, the reporter 128 may be configured to prepare notifications in different media types and the type of media selected for the reporting message may depend upon the media type of the work item. For example, if the work item corresponds to a voice call, then the reporting message may comprise a voice message that is transmitted to the communication device 108. As another example, if the work item corresponds to an email contact, then the reporting message may comprise a separate email message that is sent in reply to the original email message or it may comprise a posting on a website that is retrievable by the communication device 108.

It should be noted that the EWT module 120 does not necessarily need to reside in the work assignment mechanism 116. Rather, the EWT module 120, or portions thereof, may be implemented in the routing engine 136 or some other separate server or switch that is connected to the work assignment mechanism 116. It may also be possible to implement multiple EWT modules 120 at different locations in the contact center.

Figure 2:
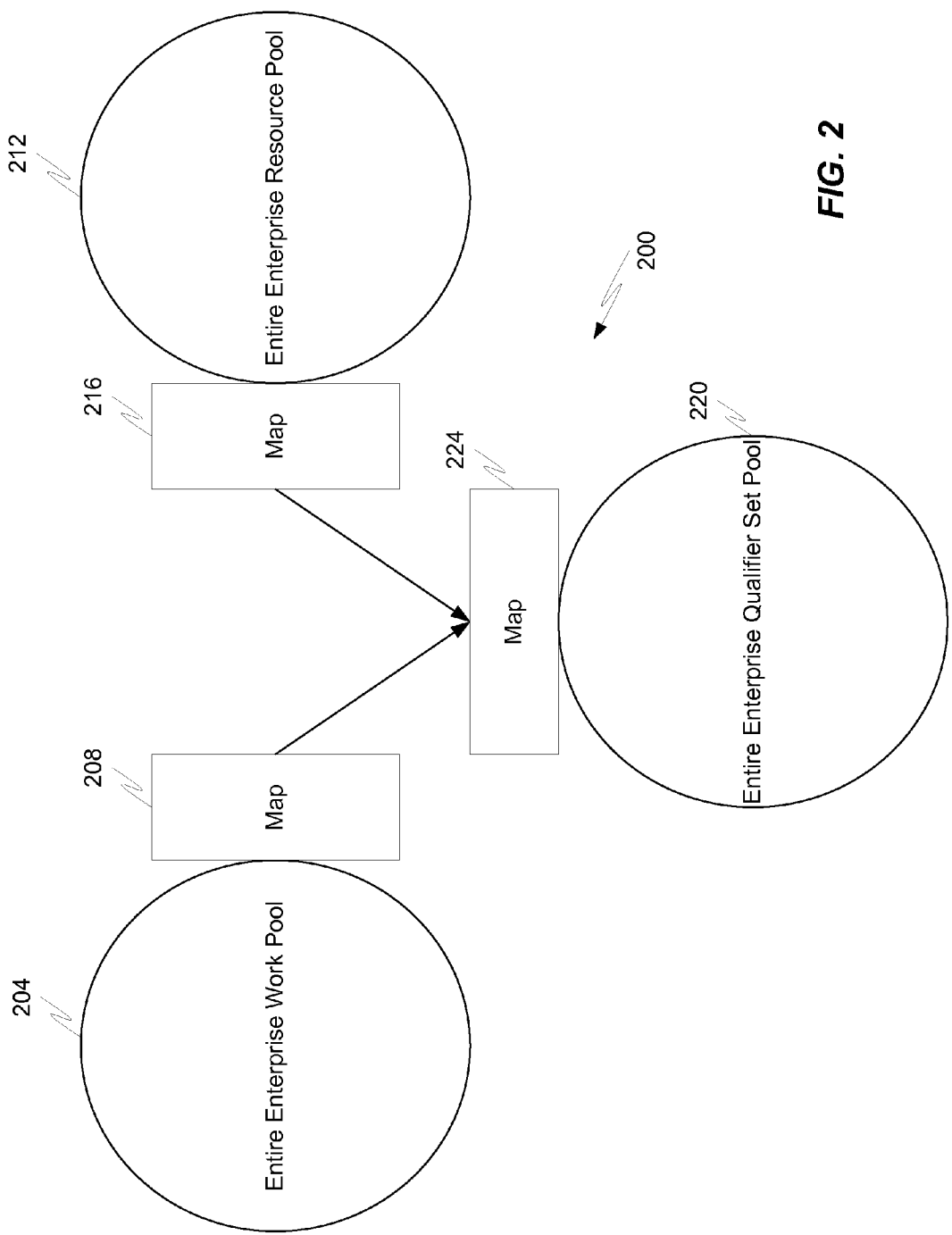
FIG. 2 is a block diagram depicting pools and bitmaps that are utilized in accordance with embodiments of the present disclosure.

FIG. 2 depicts exemplary data structures 200 which may be incorporated in or used to generate the bitmaps/tables used by the work assignment engine 132. The exemplary data structures 200 include one or more pools of related items. In some embodiments, three pools of items are provided, including an enterprise work pool 204, an enterprise resource pool 212, and an enterprise qualifier set pool 220. The pools are generally an unordered collection of like items existing within the contact center. Thus, the enterprise work pool 204 comprises a data entry or data instance for each work item within the contact center.

In some embodiments, the population of the work pool 204 may be limited to work items waiting for service by a resource 112, but such a limitation does not necessarily need to be imposed. Rather, the work pool 204 may contain data instances for all work items in the contact center regardless of whether such work items are currently assigned and being serviced by a resource 112 or not. The differentiation between whether a work item is being serviced (i.e., is assigned to a resource 112) may simply be accounted for by altering a bit value in that work item's data instance. Alteration of such a bit value may result in the work item being disqualified for further assignment to another resource 112 unless and until that particular bit value is changed back to a value representing the fact that the work item is not assigned to a resource 112, thereby making that resource 112 eligible to receive another work item.

Similar to the work pool 204, the resource pool 212 comprises a data entry or data instance for each resource 112 within the contact center. Thus, resources 112 may be accounted for in the resource pool 212 even if the resource 112 is ineligible due to its unavailability because it is assigned to a work item or because a human agent is not logged-in. The ineligibility of a resource 112 may be reflected in one or more bit values.

The qualifier set pool 220 comprises a data entry or data instance for each qualifier set within the contact center. In some embodiments, the qualifier sets within the contact center are determined based upon the attributes or attribute combinations of the work items in the work pool 204. Qualifier sets generally represent a specific combination of attributes for a work item. In particular, qualifier sets can represent the processing criteria for a work item and the specific combination of those criteria. Each qualifier set may have a corresponding qualifier set identified "qualifier set ID" which is used for mapping purposes. As an example, one work item may have attributes of language=French and intent=Service and this combination of attributes may be assigned a qualifier set ID of "12" whereas an attribute combination of language=English and intent=Sales has a qualifier set ID of "13." The qualifier set IDs and the corresponding attribute combinations for all qualifier sets in the contact center may be stored as data structures or data instances in the qualifier set pool 220.

In some embodiments, one, some, or all of the pools may have a corresponding bitmap. Thus, a contact center may have at any instance of time a work bitmap 208, a resource bitmap 216, and a qualifier set bitmap 224. In particular, these bitmaps may correspond to qualification bitmaps which have one bit for each entry. Thus, each work item in the work pool 204 would have a corresponding bit in the work bitmap 208, each resource 112 in the resource pool 212 would have a corresponding bit in the resource bitmap 216, and each qualifier set in the qualifier set pool 220 may have a corresponding bit in the qualifier set bitmap 224.

In some embodiments, the bitmaps are utilized to speed up complex scans of the pools and help the work assignment engine 120 make an optimal work item/resource assignment decision based on the current state of each pool. Accordingly, the values in the bitmaps 208, 216, 224 may be recalculated each time the state of a pool changes (e.g., when a work item surplus is detected, when a resource surplus is detected, and/or when rules for administering the contact center have changed).

Figure 3:
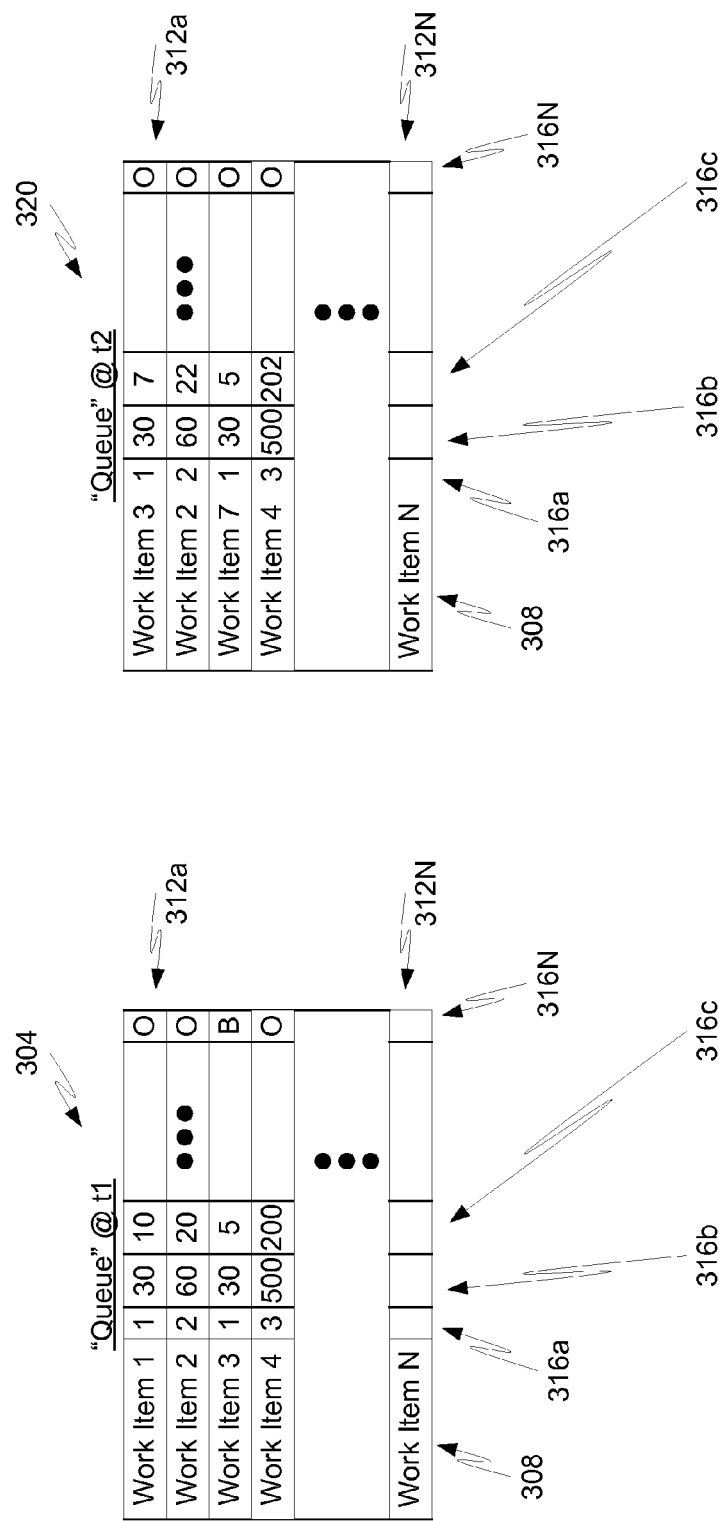
FIG. 3 is a block diagram depicting data structures used in accordance with embodiments of the present disclosure.

With reference now to FIG. 3, additional details of the data structures and algorithms which may be used in calculating estimated wait time will be discussed in accordance with embodiments of the present disclosure. Although the organization of these data structures and data structures for the qualifier set and resources will be described in terms of columns, rows, and entries, one skilled in the art will appreciate that other forms of data manipulation and organization may be utilized without departing from the scope of the present disclosure. Moreover, while only a certain number of entries (e.g., a-N) are depicted and described herein, one skilled in the art will appreciate that any number of entries may be utilized to populate the data structures described herein without departing from the scope of the present disclosure.

FIG. 3 depicts two instances of a data structure used in estimating wait time in accordance with embodiments of the present disclosure. A first instance 304 of the data structure depicts the work items in a virtual queue (e.g., in the work pool 204) at a first point in time (t1). A second instance 320 of the data structure depicts the work items in a virtual queue (e.g., in the work pool 204) at a second point in time (t2). The second point in time (t2) may follow the first point in time (t1) by one or more units of time (e.g., seconds, minutes, hours, days, weeks, months, etc.). In the depicted embodiment, the second point in time (t2) is two units of time after the first point in time (t1).

Each instance 304, 320 of the data structure may comprise data entries or rows of data entries 312a-N, each corresponding to a data entry for a different work item. Each of the rows 312a-N may comprise a number of data fields 308, 316a-N. It should be appreciated that the number of rows does not necessarily have to equal the number of columns in the data structure. The number of rows in the data structure may be greater than, less than, or equal to the number of columns in the data structure.

The first data field 308 in the data structures 304, 320 may be used to store information for identifying a particular work item in the contact center. In some embodiments, each work item in the data structure may correspond to work items waiting to be assigned to resources 112. However, the data structure may also have work items that have been assigned to resources 112, but a field value in that particular row 312 may represent that the work item has been assigned to a resource 112 whereas other work items that have not been assigned to a resource 112 may have a different value in the same data field.

In some embodiments, the set of additional data fields 316a-N may comprise data that is used by the analyzer 124 in determining an estimated wait time for the work item. A first additional data field 316a may comprise entries which indicate a type of work item. As a non-limiting example, type '1' may correspond to a first work item type, type '2' may correspond to a second work item type, type '3' may correspond to a third work item type, and so forth. Examples of work item types can include, but are not limited to, real-time work item type, non-real-time work item type, voice call, video call, email, text, chat, fax, social media, etc.

It should be appreciated that each different type of work item, or each individual work item regardless of type, may comprise a different STG and Wait Time (WT). These values may be stored in the second and third additional data fields 316b, 316c, respectively. The STG values assigned to a work item do not change as time passes; however, the WT does change according to the amount of time that passes between instances of the data structure. Accordingly, in the depicted example, the WT for each work item may be increased by two time units in the third additional data field 316c.

The data structure may also comprise data fields for other types of information such as whether or not the work item is estimated to be on-time "O" or behind schedule "B", as is depicted in the Nth additional data field 316N. Further still, the data structure may comprise data fields to store information related to OQS values, CQS values, WPG values, and any other value discussed herein that can be used to determine an estimated wait time for a work item.

As work items enter and exit the contact center, the number of rows in the data structures may change. Furthermore, multiple data structures may be employed for single instances of time without departing from the scope of the present disclosure.

Figure 4:
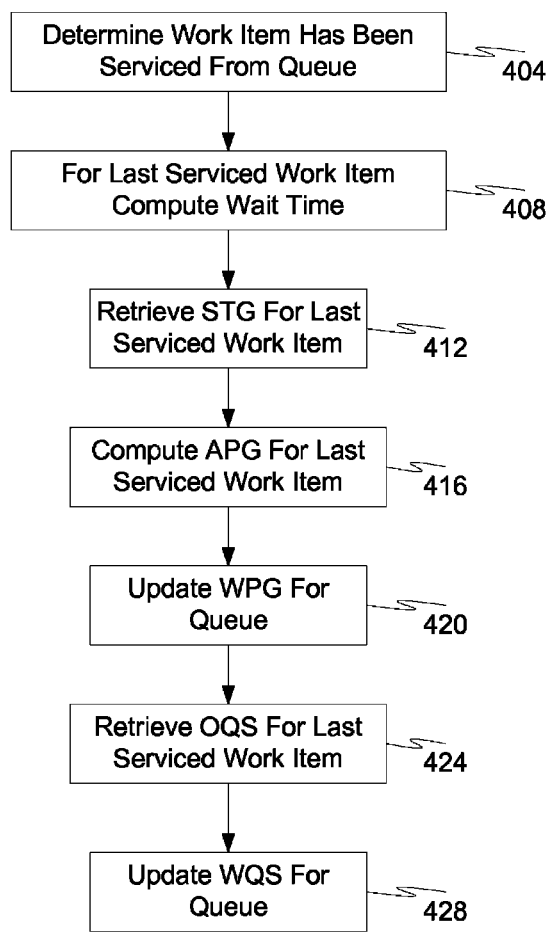
FIG. 4 is a flow diagram depicting a method of updating wait-time-related information for a queue in response to determining that a work item has been serviced in accordance with embodiments of the present disclosure.
Figure 5:
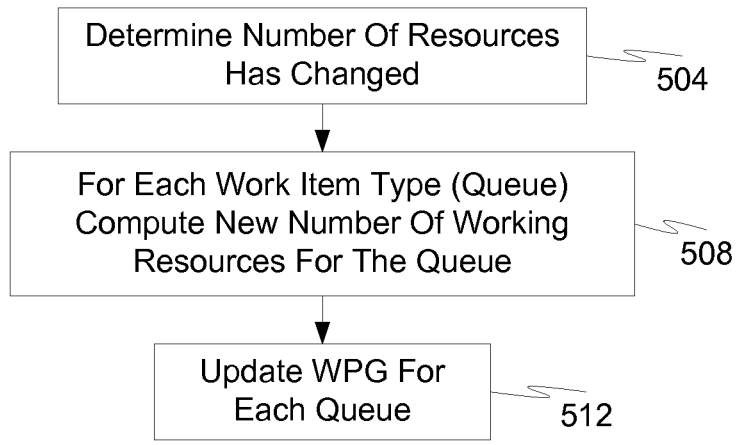
FIG. 5 is a flow diagram depicting a method of updating wait-time-related information for a queue in response to determining that the number of available resources has changed in accordance with embodiments of the present disclosure.
Figure 6:
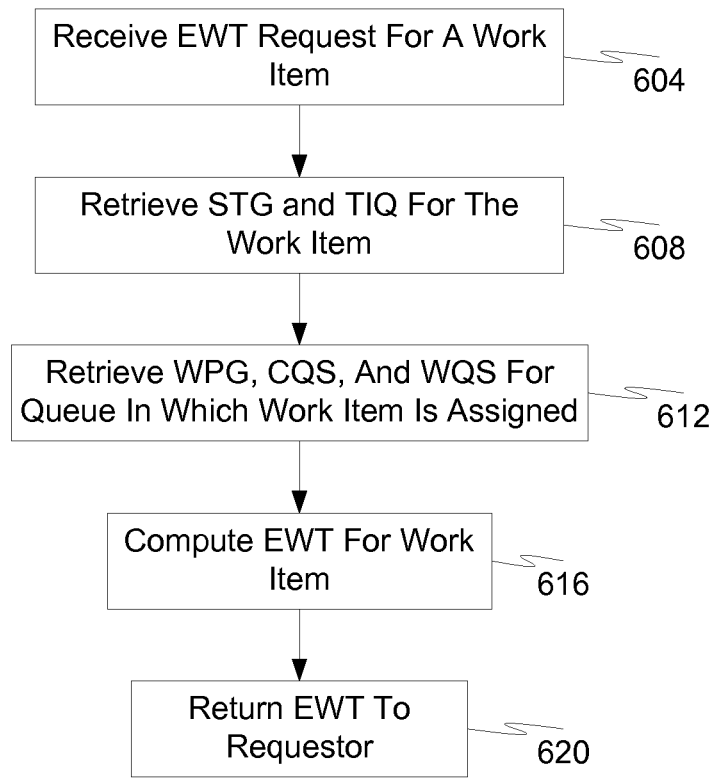
FIG. 6 is a flow diagram depicting a method of reporting estimated wait time to a requestor in accordance with embodiments of the present disclosure.

Referring now to FIGS. 4-6, operational capabilities of the EWT module 120 will be described in accordance with at least some embodiments of the present disclosure. In particular, FIG. 4 depicts a method of updating EWT information for a queue in response to determining that a work item has been serviced. The EWT module 120 begins operation by invoking the analyzer 124 to begin an estimate wait time process for work items not yet assigned to a resource 112 (e.g., a queue) (step 404). This step may be performed any time a work item is assigned to a resource or whenever the contact center enters a state of work item surplus.

The analyzer 124 then computes the actual WT for the last serviced work item (step 408). Thereafter, the analyzer 124 retrieves the STG for the last serviced work item (step 412). The retrieved WT and STG for the last serviced work item are then compared by the analyzer 124 (step 416). In other words, whenever a new work item is assigned to a resource 112, the analyzer 124 may be configured to compare the STG of the last serviced work item to the WT of the most recently-assigned work item. The comparison may be performed by dividing the WT by the STG to obtain an APG value.

After the APG value has been computed for the last serviced work item, the analyzer 124 continues by determining the WPG for the "queue" (step 420). In other words, the analyzer 124 determines the WPG for the work items in the work pool 204 waiting to be assigned to a resource 112. Thus, the term "queue" used herein does not necessarily refer to a traditional queue of work items (although it may), but rather the term "queue" can refer to a virtual queue of work items of the same type within an enterprise pool of work items of many types. The WPG for the queue may be computed as an exponential moving average of previous APGs. Thus, in some embodiments, the WPG for the queue at a given instance of time may depend upon a previously computed WPG and the currently computed APG. Furthermore, one or more multiplication factors may be used to affect the rate of change of the WPG. As can be appreciated, the multiplication factor can be used for weighing previous WPG calculations in determining each new WPG calculation. This enables each new work item to have more weight in calculating the current WPG than the previous work items. The multiplication factor may vary from anywhere between about 0.05 and about 0.95. As one example, the multiplication factor may be about 0.9.

After the APG and WPG have been calculated, the analyzer 124 continues by retrieving the OQS for the queue (step 420) and updating the WQS for the queue based on the OQS value (step 428). This updated WQS can then be used in other processes for estimating wait time for any work item still waiting for assignment to a resource 112.

FIG. 5 depicts a method of updating EWT information for a queue in response to determining that the number of resources available to service work items from the queue has changed in accordance with embodiments of the present disclosure. Accordingly, the process begins when the analyzer 124 determines that a number of resources 112 available for servicing any particular work item or set of work items (e.g., queue of work items) changes (step 504). Upon making this determination, the analyzer 124 computes, for each work item type ("queue"), the new number of resources 112 available to service work items from that queue (step 508). The analyzer 124 then calculates an updated WPG for that queue (step 512). This updated WPG may be used for calculating EWTs or modified EWTs for work items in that queue.

FIG. 6 depicts a method of returning an EWT for a work item to a requestor of the EWT information in accordance with embodiments of the present disclosure. The method begins when a request for EWT is received from a requestor (step 604). In some embodiments, the requestor may correspond to an initiator of the work item. In some embodiments, the requestor may correspond to an administrator or manager of the contact center. It may also be possible that the request is received for a plurality of work items, in which case the method described below is duplicated for each work item identified in the request.

Regardless of the requestor's identity, the receipt of the request prompts the analyzer 124 to retrieve the STG and TIQ for the work item(s) identified in the request (step 608). The analyzer 124 then retrieves the relevant WPG, CQS and WQS for the queue in which the work item is assigned or is about to be assigned (step 612). With some or all of this data, the analyzer 124 is then able to compute an EWT for the work item (step 616). The analyzer 124 passes the computed EWT to the reporter 128, which generates one or more messages that contain the computed EWT and transmits the message(s) to the requestor (step 620).

In some embodiments, the analyzer 124 simply computes the EWT by multiplying the current WPG by the STG of the work item. If, however, it is necessary to account for a sudden change in the queue characteristics, then the analyzer 124 can account for the changes by altering the algorithm for computing a modified EWT.

As one example, if the change in the queue corresponds to a sudden influx of contacts, which results in a sudden increase in the number of unassigned work items, then the analyzer 124 may utilize the OQS assigned to each work item to calculate a modified EWT that accounts for OQS, a WQS, and the CQS. In some embodiments, the analyzer 124 calculates, for a work item, a current WQS based on a previous WQS and the OQS for the work item. The modified EWT can then be calculated based on the product of the WPG and STG, which can then be multiplied by the ratio between CQS and WQS.

As another example, a modified WPG can be calculated by determining the ratio between a previous NWA and the current NWA and then multiplying that ratio by a previous WPG. This modified WPG can then be used to calculate a modified EWT.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
   receiving a first work item in a contact center; and
   determining, by a processor, an Estimated Wait Time for the first work item before it is assigned to a resource in the contact center, the Estimated Wait Time accounting for a Service Time Goal assigned to the first work item, wherein the Estimated Wait Time for the first work item is determined based, at least in part, on an Actual Percentage of Goal value determined for a second work item that has been assigned to a resource in the contact center previous to the determination of the Estimated Wait Time for the first work item, and wherein the Actual Percentage of Goal value is a ratio of a Wait Time for the second work item to a Service Time Goal for the second work item.

2. The method of claim 1, wherein the Estimated Wait Time for the first work item is determined based, at least in part, on a Weighted Percentage of Goal that is computed for the queue containing the first work item.

3. The method of claim 2, wherein the Weighted Percentage of Goal comprises an exponential moving average of previous Actual Percentage of Goals for work items that have been assigned to resources in the contact center.

4. The method of claim 2, wherein each work item that is assigned to a resource has more weight in determining the Weighted Percentage of Goal as compared to prior assigned work items.

5. The method of claim 2, wherein the Estimated Wait Time for the first work item is determined based, at least in part, on the product of the Weighted Percentage of Goal and the Service Time Goal.

6. The method of claim 1, wherein the Estimated Wait Time for the first work item accounts for one or more changes in characteristics of a queue in which the first work item is assigned.

7. The method of claim 6, wherein the Estimated Wait Time accounts for an Original Queue Size assigned to the first work item, wherein the Original Queue Size corresponds to a number of work items waiting to be assigned to resources in the contact center when the first work item was received at the contact center.

8. The method of claim 6, wherein the Estimated Wait Time accounts for a Number of Working Agents.

9. The method of claim 1, further comprising:
   generating a message that contains the Estimated Wait Time; and
   transmitting the message to a communication device associated with a customer that originated the first work item.

10. The method of claim 1, wherein the Estimated Wait Time for the first work item is determined based on a calculation of the relationship of a Weighted Percentage of Goal that is computed for the queue containing the first work item, the Service Time Goal, a Current Queue Size, and a Weighted Queue Size that is computed when the second work item is assigned.

11. The method of claim 1, wherein the Estimated Wait Time for the first work item is determined based on a calculation of the relationship of a Weighted Percentage of Goal that is computed for the queue containing the first work item, the Service Time Goal, a Current Queue Size, and a Weighted Queue Size that is computed when a Number of Working Agents changes.

12. A non-transitory computer readable medium having stored thereon instructions that cause a computing system to execute a method, the instructions comprising:
   instructions configured to determine an Estimated Wait Time for a first work item before it is assigned to a resource in a contact center, the Estimated Wait Time accounting for a Service Time Goal assigned to the first work item, wherein the Estimated Wait Time for the first work item is determined based, at least in part, on an Actual Percentage of Goal value determined for a second work item that has been assigned to a resource in the contact center previous to the determination of the Estimated Wait Time for the first work item, and wherein the Actual Percentage of Goal value is a ratio of a Wait Time for the second work item to a Service Time Goal for the second work item.

13. The computer readable medium of claim 12, wherein the Estimated Wait Time for the first work item is determined based, at least in part, on a Weighted Percentage of Goal that is computed for the queue containing the first work item.

14. The computer readable medium of claim 13, wherein the Weighted Percentage of Goal comprises an exponential moving average of previous Actual Percentage of Goals for work items that have been assigned to resources in the contact center.

15. The computer readable medium of claim 13, wherein each work item that is assigned to a resource has more weight in determining the Weighted Percentage of Goal as compared to prior assigned work items.

16. The computer readable medium of claim 14, wherein the Estimated Wait Time for the first work item is determined based, at least in part, on the product of the Weighted Percentage of Goal and the Service Time Goal.

17. The computer readable medium of claim 12, wherein the Estimated Wait Time for the first work item accounts for one or more changes in characteristics of a queue in which the first work item is assigned.

18. A contact center, comprising:
   a work assignment engine configured to assign work items received at the contact center to resources of the contact center; and
   an Estimated Wait Time module configured to determine, by a processor, an Estimated Wait Time for a first work item before it is assigned to a resource in the contact center, the Estimated Wait Time accounting for a Service Time Goal assigned to the first work item, wherein the Estimated Wait Time for the first work item is determined based, at least in part, on an Actual Percentage of Goal value determined for a second work item that has been assigned to a resource in the contact center previous to the determination of the Estimated Wait Time for the first work item, and wherein the Actual Percentage of Goal value is a ratio of a Wait Time for the second work item to a Service Time Goal for the second work item.

19. The contact center of claim 18, wherein the Estimated Wait Time is determined by multiplying a Weighted Percentage of Goal value by the Service Time Goal.

20. The contact center of claim 18, wherein the Estimated Wait Time module is further configured to report at least one of the Estimated Wait Time and a remaining wait time to a communication device operated by a customer that originated the first work item.

* * * * *